United States Patent Office 3,259,424
Patented July 5, 1966

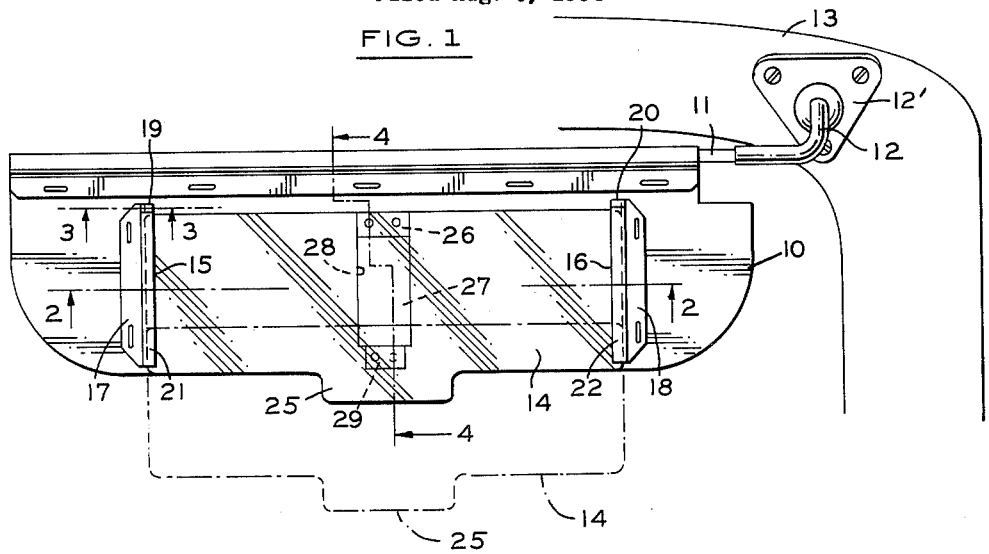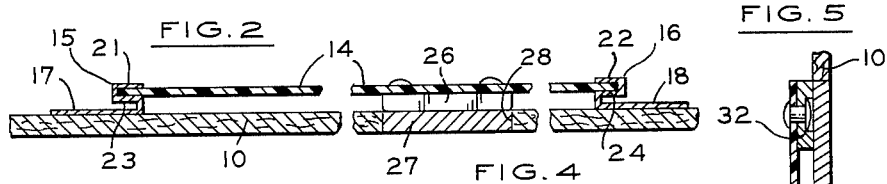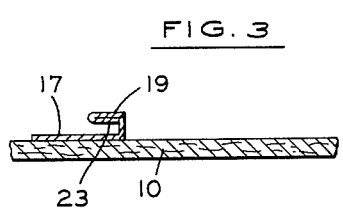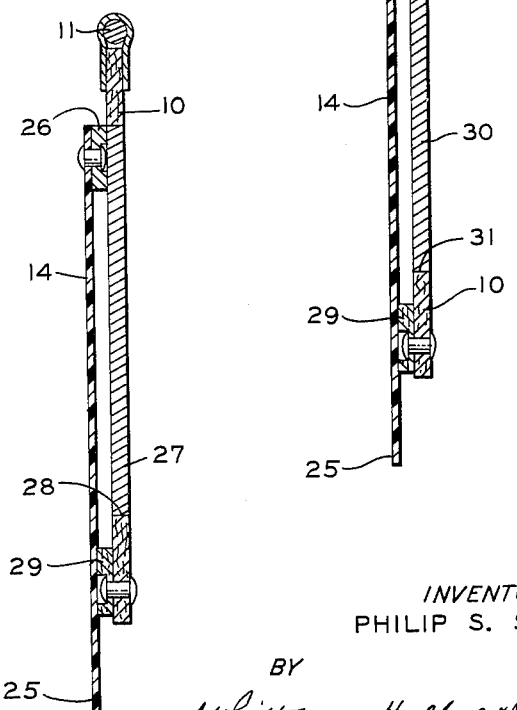
INVENTOR
PHILIP S. SWICK
BY
ATTORNEYS

3,259,424
VERTICALLY SLIDABLE EXTENSION
FOR SUN VISOR
Philip S. Swick, 19944 Fenelon, Detroit, Mich.
Filed Aug. 5, 1964, Ser. No. 387,688
11 Claims. (Cl. 296—97)

This invention relates generally to motor vehicle windshield sun visor, and refers more particularly to a vertically slidable extension therefor.

One of the essential objects of the invention is to provide an elongated sun visor of the type mentioned having an elongated translucent section or panel extending logitudinally thereof in substantially parallel relation thereto and adapted to be slid vertically downwardly below the lower longitudinal edge of the sun visor to protect the eyes of an occupant of the front seat of the motor vehicle from sun rays and the like.

Another object is to provide opposite ends of the vertically slidable panel with suitable vertically extending channel-shaped guides rigid with the sun visor and provided at their upper ends with means for limiting upward sliding movement of the panel.

Another object is to provide a vertically slidable panel having at its lower longitudinal edge substantially midway between opposite ends thereof a hand grip by which the panel may be moved vertically.

Another object is to provide a vertically slidable panel that is adapted to be held in any vertically adjusted position relative to the sun visor by means of a metal member secured to one of said elements and adapted to be attracted to a permanent magnet member secured to the other of said elements.

Another object is to provide on the sun visor adjacent the lower longitudinal edge thereof a suitable fiber block that is in the downward path of and is adapted to serve as a stop for the member aforesaid secured to the vertically slidable panel to limit downward sliding movement of such panel.

Another object is to provide a structure of the type described that is simple in construction, economical to manufacture and efficient in use.

Other objects, advantages and novel details of construction of this invention will be made more apparent as this description proceeds, especially when considered in connection with the accompanying drawing wherein:

FIGURE 1 is a rear elevational view of a motor vehicle windshield sun visor and a vertically slidably mounted panel upon the rear surface thereof, showing the sun visor pivotally connected to a portion of the windshield frame, and showing by dotted lines the panel in a vertically lowered position.

FIGURE 2 is a horizontal sectional view taken substantially on the line 2—2 of FIGURE 1.

FIGURE 3 is a horizontal sectional view taken substantially on the line 3—3 of FIGURE 1.

FIGURE 4 is a vertical sectional view taken substantially on the line 4—4 of FIGURE 1.

FIGURE 5 is a fragmentary vertical sectional view through a slight modification.

Referring now to the drawing, 10 is an elongated sun visor of any suitable material provided along its upper longitudinal edge with a rod 11 that is pivotally mounted by an elbow 12 to a bracket 12' fastened to the windshield frame 13 in the usual and well known manner.

14 is a vertically slidable elongated translucent section or panel of approximately 1/16" thickness, preferably made from plastic material, and extending longitudinally of the rear surface of the sun visor 10 in substantially parallel relation thereto, and 15 and 16 respectively are vertically extending channel-shaped metal guides embracing opposite ends of the panel 14 and having flat attaching flanges 17 and 18 respectively secured to the sun visor 10. Preferably, portions 19 and 20 respectively of the outer side walls 21 and 22 respectively of the channel-shaped guides 15 and 16 are bent or pressed inwardly toward or against the inner side walls 23 and 24 respectively thereof at the upper ends of said guides to provide means for limiting upward sliding movement of the panel 14.

As shown, the vertically slidable panel 14 has at its lower longitudinal edge substantially midway between opposite ends thereof a downwardly projecting portion 25 that serves as a hand grip by which the panel 14 may be moved vertically.

In the present instance, the vertically slidable panel 14 is adapted to be held in any vertically adjusted position relative to the sun visor 10 by means of a metal member such as a steel block 26 secured by any suitable means in surface-to-surface relation to the rear surface of the panel 14 and adapted to be attracted to a vertically extending elongated permanent magnet member 27 anchored within a suitable elongated slot 28 therefor in the sun visor 10. Preferably, such permanent magnet member 27 is magnetized from one end to the other thereof.

For limiting downward vertical sliding movement of the panel 14, there is suitable means such as a fiber block 29 secured in surface-to-surface relation to the front surface of the sun visor 10 in vertical alignment with the elongated permanent magnet member 27, so that such fiber block 29 will be in the path of and constitute an abutment for the steel block 26 on the rear surface of the panel 14 when the latter is slid downwardly.

In FIGURE 5, I have shown a slight modification wherein the vertically slidable panel 14 is adapted to be held in any vertically adjusted position relative to the sun visor 10 by means of a vertically extending elongated steel block 30 anchored within a suitable elongated slot 31 therefor in the sun visor 10 and adapted to be attracted to a block-shaped permanent magnet member 32 secured in surface-to-surface relation to the rear surface of the panel 14. Thus, in FIGURE 5 the steel block 30 and the permanent magnet member 32 have been interchanged from the positions thereof shown in FIGURE 4.

In use, the downwardly projecting portion 25 may be used to slide the panel 14 upwardly or downwardly. In this connection, the panel 14 may be slid downwardly below the lower longitudinal edge of the sun visor 10 to a suitable level to protect the eyes of an occupant of the front seat of the motor vehicle from sun rays and the like. When slid downwardly, the fiber block 29 will be in the path of either the preferred steel block 26 or the modified block-shaped permanent magnet member 32 on the rear surface of the panel 14, and will serve as a stop for such panel. When slid upwardly, the inwardly bent portions 19 and 20 respectively at the upper ends of the channel-shaped guides 15 and 16 will serve collectively as a stop for the panel 14. When slid either downwardly or upwardly between said stops, the panel 14 will be automatically and effectively held in any adjusted position by the attraction of either the steel block 26 to the permanent magnet member 27, or by the attraction of the modified steel block 30 to the modified block-shaped permanent magnet member 32.

What I claim as my invention is:

1. In combination, an elongated windshield sun visor, an elongated translucent panel extending longitudinally of said sun visor in substantially parallel relation thereto and adapted to be slid vertically downwardly below the lower longitudinal edge of said sun visor, vertically extending guides for said panel rigid with the sun visor and provided at their upper ends with means for limiting upward sliding movement of said panel, said panel having at its lower longitudinal edge substantially midway between opposite ends thereof means serving as a hand grip by which the panel may be moved vertically, means for holding said panel in vertically adjusted position relative to said sun visor including a metal member secured to one of said elements and adapted to be attracted to a permanent magnet member secured to the other of said elements, and means on the sun visor adjacent the lower longitudinal edge thereof disposed in the downward path of and adapted to serve as a stop for one of the members aforesaid to limit downward sliding movement of said panel.

2. The combination defined in claim 1, wherein the vertically extending guides have portions overlapping opposite ends of said panel.

3. The combination defined in claim 1, wherein the vertically extending guides have flat attaching flanges secured to said sun visor.

4. The combination defined in claim 1, wherein the vertically extending guides are channel-shaped and embrace opposite ends of said panel, and wherein portions of the outer side walls of said channel-shaped guides are bent inwardly toward the inner side walls thereof for limiting upward sliding movement of said panel.

5. The combination defined in claim 1, wherein the means at the lower longitudinal edge of said panel serving as a hand grip is a downwardly projecting portion of said panel.

6. The combination defined in claim 1, wherein the panel is approximately 1/16" thick, and is made of plastic material.

7. The combination defined in claim 1, wherein the metal member is secured to said paned, and wherein the permanent magnet member is secured to said sun visor.

8. The combination defined in claim 1, wherein the metal member is secured to said sun visor, and wherein the permanent magnet member is secured to said panel.

9. The combination defined in claim 1, wherien the metal member is a steel block and is secured in surface-to-surface relation to the rear surface of said panel, and wherein the permanent magnet member is a vertically extending elongated member anchored within an elongated slot in said sun visor.

10. The combination defined in claim 1, wherein the metal member is a vertically extending elongated member anchored within an elongated slot in said sun visor, and wherein the permanent magnet member is a block-shaped member secured in surface-to-surface relation to the rear surface of said panel.

11. The combination defined in claim 1, wherein the means on the sun visor adjacent the lower longitudinal edge thereof is a fiber block secured in surface-to-surface relation to the front surface of said sun visor.

References Cited by the Examiner
UNITED STATES PATENTS

| | | | |
|---|---|---|---|
| 2,228,209 | 1/1941 | Harrington | 296—97 X |
| 2,422,863 | 6/1947 | Stroth | 296—97 |
| 2,603,530 | 7/1952 | Jones | 296—97 |

References Cited by the Applicant
UNITED STATES PATENTS

| | | |
|---|---|---|
| 2,613,104 | 10/1952 | Parsons. |

BENJAMIN HERSH, *Primary Examiner.*

J. A. PEKAR, *Assistant Examiner.*